(12) United States Patent
Wang

(10) Patent No.: US 6,541,599 B1
(45) Date of Patent: *Apr. 1, 2003

(54) PROCESS FOR MANUFACTURE OF SOLUBLE HIGHLY BRANCHED POLYAMIDES, AND AT LEAST PARTIALLY ALIPHATIC HIGHLY BRANCHED POLYAMIDES OBTAINED THEREFROM

(75) Inventor: Jin-Shan Wang, Pittsford, NY (US)

(73) Assignee: Eastman Kodak Company, Rochester, NY (US)

( * ) Notice: Subject to any disclaimer, the term of this patent is extended or adjusted under 35 U.S.C. 154(b) by 0 days.

This patent is subject to a terminal disclaimer.

(21) Appl. No.: 09/919,097

(22) Filed: Jul. 31, 2001

(51) Int. Cl.$^7$ .................. C08G 69/02; C08G 73/00; C08G 63/44
(52) U.S. Cl. .................. 528/310; 528/271; 528/272; 528/288; 528/313; 528/315; 528/332; 528/335; 528/336; 528/363; 528/422
(58) Field of Search .................. 528/310, 271, 528/272, 288, 312, 315, 332, 335, 336, 363, 422

(56) References Cited

U.S. PATENT DOCUMENTS

| | | |
|---|---|---|
| 3,669,939 A | 6/1972 | Baker et al. |
| 4,857,630 A | 8/1989 | Kim |
| 5,041,516 A | 8/1991 | Frechet et al. |
| 5,196,502 A | 3/1993 | Turner et al. |
| 5,225,522 A | 7/1993 | Turner et al. |
| 5,227,462 A | 7/1993 | Turner et al. |
| 5,418,301 A | 5/1995 | Hult et al. |
| 5,514,764 A | 5/1996 | Frechet et al. |
| 5,567,795 A | 10/1996 | Vicari et al. |
| 5,663,247 A | 9/1997 | Sorensen et al. |
| 5,663,260 A | 9/1997 | Frechet et al. |
| 6,252,025 B1 | 6/2001 | Wang et al. |
| 6,300,424 B1 * | 10/2001 | Frechet et al. ............... 525/444 |
| 6,444,758 B2 * | 9/2002 | McNamara et al. ........ 525/302 |

OTHER PUBLICATIONS

Atsushi Kameyama et al; "Synthesis Of Reactive Polyesters By A Regioselective Addition Reaction Of Diepoxides With Diacyl Chlorides And Their Chemical Modification"; Macromolecules; 1992; vol. 25; pp. 2307–2311.

Paul J. Flory; "Molecular Size Distribution In Three Dimensional Polymers. VI. Branched Polymers Containing A–R–$B_{f-1}$ Type Units"; J. Amer. Chem. Soc.; 1952; vol. 74; pp. 2718–2723.

Todd Emrick et al; "An $A_2+B_3$ Approach To Hyperbranched Aliphatic Polyethers Containing Chain End Epoxy Substitutes"; Macromolecules; 1999; vol. 32; pp. 6380–6382.

Mitsutoshi Jikei et al; "Communications To The Editor—Synthesis Of Hyperbranched Aromatic Polyamide From Aromatic Diamines And Trimesic Acid"; Macromolecules; 1999; vol. 32; pp. 2061–2064.

Young H. Kim; "Lyotropic Liquid Crystalline Hyperbranched Aromatic Polyamides"; J. Amer. Chem. Soc.; 1992; vol. 114; pp. 4947–4948.

C. J. Hawker et al; "One–Step Synthesis Of Hyperbranched Dendritic Polyesters"; J. Amer. Chem. Soc.; 1991; vol. 113; pp. 4583–4588.

Jin–Shan Wang et al; US Ser. No. 09/919,390, filed Jul. 31, 2001; "Water Soluble And Dispersible Highly Branched Polyamides".

* cited by examiner

Primary Examiner—P. Hampton-Hightower
(74) Attorney, Agent, or Firm—Andrew J. Anderson

(57) ABSTRACT

A process for the manufacture of soluble hyperbranched polyamides is disclosed comprising the steps of combining multifunctional monomer reactants comprising amine and carboxylic acid functional groups in a reactor with water, and reacting amine and carboxylic acid functional groups of the multi-functional monomers at elevated temperature and pressure for a period of time sufficient to form a highly branched polyamide. The present invention advantageously provides a simple, practical, and environmentally friendly process for the manufacture of soluble hyperbranched polyamides comprising multifunctional in-chain and/or end groups. The present invention also provides a process for the manufacture of soluble hyperbranched polyamides from monomers with a broad range of the ratio of functional amine groups to acid groups. The invention is also directed towards soluble highly branched polyamides which may be obtained by a process of the invention, which comprise monomer units derived from multifunctional amine or multifunctional acid functional group containing aliphatic monomers.

28 Claims, No Drawings

PROCESS FOR MANUFACTURE OF SOLUBLE HIGHLY BRANCHED POLYAMIDES, AND AT LEAST PARTIALLY ALIPHATIC HIGHLY BRANCHED POLYAMIDES OBTAINED THEREFROM

FIELD OF THE INVENTION

The present invention relates to a process for the manufacture of hyperbranched polymers, and polymers made by such process. Specifically, the present invention relates to a practical polymerization process for the manufacture of hyperbranched polyamides in water, and hyperbranched polyamides made from such process employing aliphatic multifunctional monomers and specific ratios of amine to carboxylic acid groups.

BACKGROUND OF THE INVENTION

Polyamides represent one of the most important groups of polymers with excellent heat and flame resistance and high tensile strength and modulus. Branched polymers and copolymers have attracted considerable attention over the past decades, since many advanced materials with new or improved properties can be obtained therefrom. The terms "hyperbranched" and "highly branched" used herein with respect to branched polymers are intended to designate polymers having a relatively high percentage of propagated branching sites per number of polymerized monomer units, e.g. at least one branching site per every ten monomer units, preferably at least one branching site per every five monomer units and more preferably at least one branching site per every three monomer units. Highly branched polymers can be made by multi-step or one step processes. Multi-step generation processes were exemplified by Frechet in U.S. Pat. No. 5,041,516 and by Hult in U.S. Pat. No. 5,418,301. Both patents described that the highly branched polymers known as dendrimer or "starburst polymer" were made through a series of growth steps consisting of repeatedly reacting, isolating, and purifying.

One-step process was first conceptualized by Flory (J. Am. Chem. Soc., 74, p2718 (1952)) who demonstrated by theoretical analysis that a highly branched and soluble polymers could be formed from monomers comprising the structure $AB_2$, where A and B are reactive groups, by one-step condensation polymerization. In contrast to the dendrimers, the polymer formed by $AB_2$ polymerization is randomly branched. Most $AB_2$ type monomers, however, are not commercially available, and access to such monomers accordingly involves synthetic efforts, which is potentially problematic, especially on a large scale. To cope with such problem, one-step process for formation of a highly branched polymer may also use an $A_2+B_3$ approach. In $A_2+B_3$ polymerization, di- and tri-functional monomers are reacted together. For ideal $A_2+B_3$ polymerization, intramolecular cyclization must be minimized as a competing and chain terminating process during polymer propagation, all A groups and all B groups should have near equal reactivity in both the monomers as well as the growing polymers, and the A and B groups should have exclusive reactivity with each other. In view of such requirements, relatively few specific combinations of $A_2+B_3$ polymerization schemes have been proposed.

With regard to the synthesis of hyperbranched polyamides from $AB_2$-type monomers, Kim reported the synthesis of hyperbranched aromatic polyamides from sulfinyl amino acid chloride derivatives in organic solvents (J. Am. Chem. Soc., 114, 4947 (1992)). U.S. Pat. No. 5,514,764 disclosed preparation of hyperbranched aromatic polyesters and polyamides by a one-step process of polymerizing a monomer of the formula A—R—$B_2$ where R represents an aromatic moiety. U.S. Pat. No. 5,567,795 disclosed synthesis of highly branched polymers in a single processing step by using branching aromatic monomers and an end-capping monomer. With regard to $A_2+B_3$ polymerization, Jikei et al (Macromolecules, 32, 2061 (1999)), e.g., has reported synthesis of hyperbranched aromatic polyamides from aromatic diamines and trimesic acid. Copending, concurrently filed, commonly assigned U.S. Ser. No. 09/919,390 is directed towards the synthesis of novel highly branched water soluble or dispersible polyamides using, e.g., an $A_2+B_3$ or $AB_2$ approach by condensation polymerization of multifunctional monomer reactants comprising amine and carboxylic acid functional groups, where in order to obtain a water soluble or dispersible hyperbranched polyamide, at least one of the multifunctional monomer unit reactants contains an amine, phosphine, arsenine or sulfide group, such that the highly branched polyamide contains in the backbone thereof an N, P, As or S atom capable of forming an onium ion.

There are, however, disadvantages associated with the polymerization processes described in the prior art for the manufacture of hyperbrancbed polyamides. First, the use of organic solvent is not environmentally friendly and practical. Second, as shown previously by Jikei and others (Macromolecules, 32, 2061 (1999)), the $A_2+B_3$ polymerization of aromatic di-amine ($A_2$) and aromatic tri-carboxylic acid ($B_3$) can result in gelation within 10–20 min when the feed ratio of amino and carboxyl groups was equal to 1. Moreover, even with the feed ratio of 2:3 of amine to acid group in $A_2+B_3$ approach of Jikei, the polymerization reaction employing solely aromatic monomers may only lead to soluble materials under certain conditions such as at very low concentration of monomer (<5g/L).

The conventional process for manufacturing commercial linear aliphatic polyamides is known as the "salt-strike" process. In this process, aliphatic dicarboxylic acid monomer is admixed with aliphatic diamine monomer in aqueous solution to form a salt. The salt is fed into a reactor in which both temperature and pressure are elevated. With the emission of water and volatile matter, molten polymer is formed and discharged. The following limitations may be associated with the described manufacture of linear polyamides: (a) the molar ratio of diamine and diacid must be equal to 1, or only low molecular weight material is obtained, (b) even with the ratio of diamine and diacid being 1, post-polymerization of pre-polymer at even higher temperature is often required in order to get high molecular weight material, (c) the resultant polymer chain usually only possesses limited $NH_2$ and/or COOH functionality (mostly not more than 2), and (d) high molecular weight linear polyamides are generally characterized by poor processability and solubility.

It would be desirable to provide a simple, practical, and environmentally friendly process for the manufacture of soluble hyperbranched polyamides with multifunctional groups. There is also another need to develop a manufacturing process which will work well with broader ranges of the ratio of amine groups to acidic groups. It would be further desirable to provide soluble highly branched polyamides obtained by condensation of multifunctional amine and multifunctional acid monomers where at least one of the multifunctional monomers is aliphatic, and where the ratio of total amine functional groups to total acid functional groups of the monomers is close to one.

SUMMARY OF THE INVENTION

In accordance with one embodiment of the invention, a process for the manufacture of soluble hyperbranched polyamides is disclosed comprising (a) combining in a reactor water and ($a_1$) multi-functional di- or higher amine functional group containing monomers represented by the following formula (I) and multi-functional di- or higher carboxylic acid functional group containing monomers represented by the following formula (II), or a preformed salt of such di- or higher functional monomers, or ($a_2$) multi-functional branching monomers of the formula (III):

$$R^1(NH_2)_x \quad (I)$$

$$R^2(COOH)_y \quad (II)$$

$$A_n-L-B_m \quad (III)$$

where in formulas (I) and (II), $R^1$ and $R^2$ are each independently a monomeric, oligomeric, or polymeric compound nucleus, x and y are integers of at least 2, preferably from 2 and 4, without x and y being 2 at the same time, and in formula (III), one of A and B represents an amine functional group, the other of A and B represents a carboxylic acid functional group, L represents a monomeric, oligomeric, or polymeric compound nucleus linking group between A and B, n is at least 1 and m at least 2, and preferably n is 1 and m is 2 or 3, and wherein multiple carboxylic acid functional groups of a multi-functional monomer may be in anhydride form, and (b) reacting amine and carboxylic acid functional groups of the multi-functional monomers at a temperature of at least 100° C. and a pressure of at least 140 kPa, wherein polymerization proceeds by reaction of an amine group of a first monomer unit with an acid group of a second monomer unit to form a reaction product having an amide linkage between the first and second monomer units and repetition of such amidation reaction between additional amine groups and acid groups of the multi-functional monomers and reaction products of the multi-functional monomers for a period of time sufficient to form a highly branched polyamide.

In accordance with another embodiment, the invention is also directed towards soluble highly branched polyamides obtained from condensation of multifunctional amine and multifunctional acid functional group containing monomer reactants, wherein at least one of the multifunctional amine and the multifunctional acid monomers is aliphatic and the ratio of total amine functional groups to carboxylic acid functional groups in the monomer reactants is from 0.3 to 3.

In accordance with a further embodiment, the invention is also directed towards soluble highly branched polyamides obtained from condensation of multifunctional amine and multifunctional acid functional group containing monomer reactants, wherein at least one of the multifunctional amine and the multifunctional acid monomers is aliphatic and the weight averaged molecular weight is above 1,000.

The present invention advantageously provides a simple, practical, and environmentally friendly process for the manufacture of soluble hyperbranched polyamides comprising multifunctional in-chain and/or end groups. The present invention also provides a process for the manufacture of relatively high molecular weight soluble hyperbranched polyamides from multifunctional aliphatic monomers with a broad range of the ratio of functional amine groups to acid groups, and uniquely enables the formation of at least partially aliphatic polyamides wherein the ratio of total amine functional groups to carboxylic acid functional groups in the multifunctional monomer reactants is close to 1. Soluble hyperbranched polyamides may be obtained with commercially available materials and existing facility, of which the residual terminal groups may be functionalized and chemically capped.

DETAILED DESCRIPTION OF THE INVENTION

The process of the present invention comprises the steps of combining multifunctional monomer reactants comprising amine and carboxylic acid functional groups in a reactor with water, and reacting amine and carboxylic acid functional groups of the multi-functional monomers at elevated temperature and pressure for a period of time sufficient to form a highly branched polyamide. Polymerization proceeds by reaction of an amine group of a first monomer unit with an acid group of a second monomer unit to form a reaction product having an amide linkage between the first and second monomer units and repetition of such amidation reaction between additional amine groups and acid groups of the multi-functional monomers and reaction products of the multi-functional monomers. The resulting highly branched polymer may be discharged from the reactor, and precipitated and purified according to conventional polymerization procedures, or the aqueous polymer solution may be directly further used.

In accordance with one embodiment of the invention, the multifunctional monomer reactants may comprise a combination of di- or higher amine functional group containing monomers and di- or higher carboxylic acid functional group containing monomers, wherein at least one of the amine group or the acid group containing monomers is a tri- or higher amine or acid functional group containing monomer, or a preformed salt of such di- or higher functional monomers. The polymerization process comprising multifunctional monomers can be considered as $A_x+B_y$ hyperbranching polymerization where one of $A_x$ and $B_y$ represents a multi-functional amine group containing monomer and the other of $A_x$ and $B_y$ represents a multi-functional carboxylic acid group containing monomer. There is no particular requirement with regard to co-monomers of multifunctional amines and multifunctional acids used in the present process of manufacturing soluble hyperbranched polyamides, with the exceptions that the number of functionalities x and y of the co-monomers are each at least 2 with the functionality of at least one of the co-monomers being 3 or more.

The compounds with multiple amine substitutes can be represented by the following formula (I):

$$R^1(NH_2)_x \quad (I)$$

and the multiple acids can be represented by the following formula (II):

$$R^2(COOH)_y \quad (II)$$

wherein:
  $R^1$ and $R^2$ are each independently a monomeric, oligomeric, or polymeric compound nucleus, and x and y are integers of at least 2, preferably between 2 and 4, without x and y being 2 at the same time. Each $R^1$ and $R^2$ compound nucleus may comprise, e.g., a further substituted or unsubstituted straight or branched alkyl, cycloalkyl, aryl or alkylaryl linking group moiety, or an oligomeric or polymeric chain moiety, to which the functional groups are attached.

In a preferred embodiment, one of the multifunctional amines and multifunctional acids is di-functional (i.e., one of x and y is 2 in Formula I and II), and the other is tri- or tetra-functional (i.e., the other of x and y is 3 or 4 in Formula I and II). In a particularly preferred embodiment, one of the multifunctional amines and multifunctional acids is di-functional, and the other is tri-functional. In a particular embodiment, the present invention may employ anhydride group containing monomers as multifunctional acid monomers. With regard to anhydride group containing monomers, each anhydride group is considered as supplying two functional acid groups in the present process.

A particular embodiment of the invention is directed towards soluble highly branched aliphatic or partially aliphatic polyamides obtained from condensation of multifunctional amine and multifunctional acid functional group containing monomer reactants, wherein at least one of the multifunctional amine and the multifunctional acid monomers is aliphatic (i.e., non-aromatic) and the ratio of total amine functional groups to carboxylic acid functional groups in the monomer reactants is from 0.3 to 3. Condensation of multifunctional aliphatic monomers to form soluble highly branched polyamides in organic solution has been found to be particularly problematic, especially where the ratio of amine groups to carboxylic acid groups of the multifunctional monomer reactants is close to one (e.g., between 0.3 and 3). The process of the invention advantageously enables the preparation of unique aliphatic and partially aliphatic highly branched polyamides.

Examples of multifunctional amines which may be used in the present invention include but are not limited to: tris(2-aminoethyl)amine, tris(2-aminopropyl)amine, diaminohexane, ethylenediamine, diethylenetriamine, p-pheneylene diamine, 4,4'-oxydianiline, Jeffamines, and amino-substituted polydimethylsiloxanes.

Examples of multifunctional acids which may be used in the present invention include but are not limited to: succinic acid, adipic acid, 1,4-cyclohexyl dicarboxylic acid, tall oil fatty acids, sebacic acid, dodecanedioic acid, dimer acids, C-19 dicarboxylic acid, C-21 dicarboxylic acid, nitrilotriacetic acid, trimesic acid, phthalic acid, isophthalic acid, terephthalic acid.

Examples of multifunctional acids in anhydride form which may be used in the present invention include but are not limited to succinic anhydride, (cis-/trans-)1,2-cyclohexanedicarboxylic anhydride, 1,2,4,5-benzenetetracarboxylic dianhydride, 1,2,3,4-cyclopentane-tetra-carboxylic dianhydride.

In another particular embodiment of the present invention, a pre-formed salt or an admixture of multifunctional amine, multifunctional acid or anhydride may be employed. The said pre-formed salt may be made in-situ or made separately. The salt made separately may be either purified prior to polymerization in accordance with the invention, or used in the form of a crude solution prepared in water.

In accordance with a further embodiment of the invention, the multifunctional monomer reactants may comprise multifunctional branching monomers of the formula (III):

$$A_n-L-B_m \tag{III}$$

where one of A and B represents an amine functional group, the other of A and B represents a carboxylic acid functional group, L represents a linking group between A and B, and n is at least 1 and m at least 2. L may be any monomeric, oligomeric, or polymeric compound nucleus, such as a further substituted or unsubstituted straight or branched alkyl, cycloalkyl, aryl or alkylaryl linking group moiety, or an oligomeric or polymeric chain moiety, and n preferably represents 1 and m preferably represents 2 or 3, and most preferably 2. Multifunctional $A_n-L-B_m$ branching monomers may themselves be commercially available, or may be prepared from commercially available starting materials using conventional reaction procedures. Multifunctional branching monomers may be pre-formed and isolated prior to subsequent reaction, or may be prepared in-situ in the formation of a highly branched polyamide in accordance with the invention. As in the case of $A_x+B_y$ type hyperbranching polymerization as described above, multiple carboxylic acid functional groups of a multi-functional branching monomer may be in anhydride form.

Examples of multifunctional branching monomers for use in accordance with the invention include but are not limited to: 2,3-diaminoproponic acid, 2,5-diaminopentanoic acid, 1-Lysine hydrate.

As disclosed in copending, concurrently filed, commonly assigned U.S. Ser. No. 09/919,390, the disclosure of which is hereby incorporated by reference, a highly branched water soluble or dispersible polyamide may be obtained using an $A_2+B_3$ or $AB_2$ approach by condensation polymerization of multifunctional monomer reactants comprising amine and carboxylic acid functional groups, where in order to obtain a water soluble or dispersible hyperbranched polyamide, at least one of the multifunctional monomer unit reactants contains an amine, phosphine, arsenine or sulfide group, such that the highly branched polyamide contains in the backbone thereof an N, P, As or S atom capable of forming an onium ion. The present invention may be advantageously employed for formation of such water soluble or dispersible polyamides.

In the case of using anhydride group containing multifunctional monomers, a hybrid approach comprising both $A_xB_y$ and $A_x+B_y$ type hyperbranching polymerization may be employed, since a variety of monomers are formed through reacting amine and anhydride depending upon the experimental conditions employed. For example, the mixture of triamine 1 and mono-anhydride 2 may yield the following different kinds of monomers wherein the content of each monomer is strongly dependent of the molar ratio of tramine to mono-anhydride, the method of preparation, and other experimental factors:

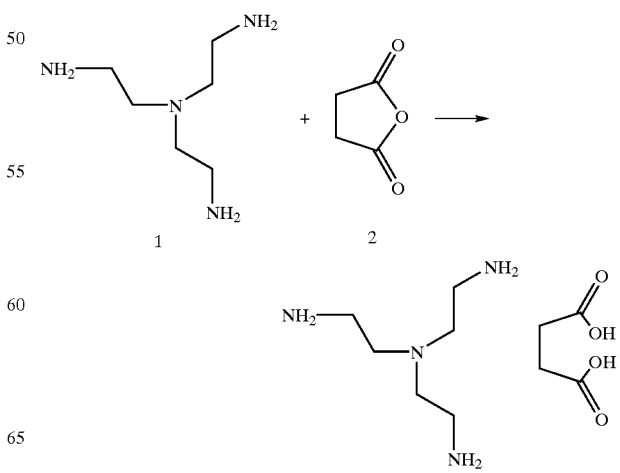

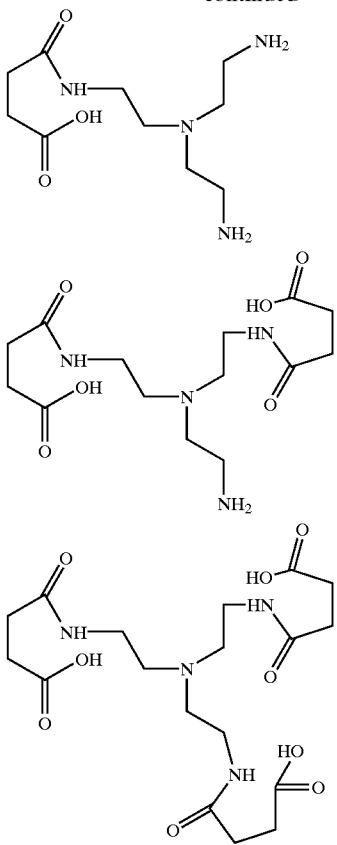

The present process yields hyperbranched polyamide having at least one branched center with one branch site and at least one amide linkage along its backbone. One or more structural modifiers may additionally be fed to the reactor together with the multifunctional monomer(s) to modify the chemical structure or architecture of the final polymers may be modified by adding suitable mono- or multi-functional modifiers. Also, other functional or special groups may be introduced by adding mono- or multifunctional agents. Highly branched polyamides may be prepared in accordance with the invention employing a pure single $A_n$—L—$B_m$ type branching monomer compound in a "self-condensation" reaction, $A_x$ and $B_y$ multifunctional monomers in a co-condensation reaction, or a mixture of a variety of branching monomers or branching monomers and non-branching monomers may be employed to achieve a combination of self-condensation and co-condensation.

Hyperbranched polyamides may be obtained which have number average molecular weights of from 100 to $10^8$ and polydispersity (the ratio of weight-average molecular weight to number-average molecular weight) from 1.01 to 200.

The temperature and pressure of polymerization, as well as the ratio of amine to acid (or anhydride) groups of the monomers and the amount of water employed in the process of the present invention, are factors which can control the molecular weight, the nature and number of functional groups, the branching degree, and other structural features of the resulting hyperbranched polyamides.

In a preferred embodiment, the temperature employed during polymerization is from 100 to 350° C., more preferably 150 to 280° C., and the pressure varies from 140 kPa to $50 \times 10^3$ kPa, preferably from 600 to $7 \times 10^3$ kPa. It is an advantage of the invention that polymerization of relatively high molecular weight highly branched polyamides can be obtained in a single polymerization step at such only moderately elevated temperatures. Optionally, solid polymer synthesized at such temperatures can be heated to even higher temperature in order to facilitate further reaction and obtain higher molecular weight polymer.

In a preferred embodiment, the ratio of amine to acid groups (including acid functional groups of any anhydride groups) varies from 0.1 to 10, more preferably 0.2 to 6, most preferably 0.3 to 3. It is an advantage of the invention that relatively high molecular weight highly branched polymers can be obtained which are still soluble (i.e., without gelation), even where functional group ratios are close to 1. Water is required for conversion of multi-functional monomers to soluble hyperbranched polyamide without gelation in accordance with the process of the invention. In a preferred embodiment, the content of water may be from 0.1 to 99.9 wt % in relative to total amount of reaction solution, more preferably 0.5 to 50 wt %, most preferably 1 to 30 wt %.

The present process is conducted preferably in the absence of a catalyst. However, any catalysts that can facilitate the polymerization and enhance the degree of the control of the molecular weight, the nature and number of functional groups, the branching degree, and other structural features of the hyperbranched polyamide can be optionally used.

The hyperbranched polyamides obtained by the present invention can be made through batch process, semi-batch process, continuous process, and the like. Many of these processes have been well documented. The polymerization reactor preferably may be of the type typically used in the synthesis of linear polyamides, for example a stainless steel autoclave.

The reaction time required to complete polymerization varies depending upon the specific polymerization system and experimental conditions employed. In a typical embodiment, the polymerization time will be from 0.1 to 100 hours, more typically 0.5 to 5 hours. Combinatorial chemistry and experimental design can be used in the present invention to explore and optimize the experimental conditions.

The final polymers can be purified with known processes such as precipitation, extraction, and the like. Polymers can be used in the forms of solid particle, solution, dispersion, and the like. Since the hyperbranched polyamides made from the present invention comprise either $NH_2$ or COOH or both of $NH_2$ and COOH functional end groups, the modification of $NH_2$ and COOH groups through conventional reactions may yield hyperbranched polyamides with a variety of functional means and with more complex structure/architecture.

The polymers and copolymers prepared in the present invention can be used in a variety of applications such as plastics, elastomers, fibers, engineering resins, coatings, paints, adhesives, asphalt modifiers, detergents, diagnostic agents and supports, dispersants, emulsifiers, rheology modifiers, viscosity modifiers, in ink and imaging compositions, as leather and cements, lubricants, surfactant, as paper additives, as intermediates for chain extensions such as polyurethanes, as additives in inkjet, printing, optical storage, photography, photoresist, and coloration of polymer, as water treatment chemicals, cosmetics, hair products, personal care products, polymeric dyes, polymeric couplers, polymeric developers, antistatic agents, in food and beverage packaging, pharmaceuticals, carriers for drug and biological materials, slow release agent formulations, crosslinking agents, foams, deodorants, porosity control agents, complexing and chelating agents, carriers for chiral resolution agents, catalysts, carriers for gene transfection, for encapsulation, as light harvesting materials, as non-linear optical materials, to form super macromolecular assemble.

EXAMPLES

The invention can be better appreciated by reference to the following specific embodiments.

Examples 1–2
Hyperbranching Polymerization of tris(2-aminoethyl)amine ($A_3$) and 1,4-cyclohexanedicarboxylic acid ($B_2$) in water A typical example of making hyperbranched polyamides from hyperbranching polymerization of tris(2-aminoethyl) amine ($A_3$) and 1,4-cyclohexanedicarboxylic acid ($B_2$) in water is described as follows:

Example 1: To a three-neck round flask equipped with a stirring bar and water condenser, 117 grams (0.6838 mol) of 1,4-cyclohexanedicarboxylic acid, 100 grams (0.6838 mol) of tris(2-aminoethyl)amine, and 440 ml of deionized water were added. The solution was heated at 60° C. for three hours. The salt solution obtained was concentrated to contain ca. 65 wt % solid (35 wt % water) and then added to a 1 liter stainless steel autoclave. Polymerization was carried out at 235° C. and ca. $3.3 \times 10^3$ kPa (416–480 psi) for 3 hours. The polymer was precipitated twice from cold acetone and dried at room temperature under vacuum for 24 hours.

Example 2: The general process of Example 1 was repeated, except for changing the molar ratio of reactants to obtain a different ratio of reactive $NH_2$ and COOH groups.

Table 1 summarizes the results for hyperbranching polymerization of tris(2-aminoethyl)amine ($A_3$) and 1,4-cyclohexanedicarboxylic acid ($B_2$).

TABLE 1

| No | [A]/[B]$^a$ | Yield$^b$ | Tg, ° C. | $M_{w,SEC}{}^c$ | Solubility$^d$ | | |
|---|---|---|---|---|---|---|---|
| | | | | | Water | Methanol | Acetone |
| 1 | 3/2 | 72% | 130 | ~20K | S | S | N |
| 2 | 3/1 | 30% | 65 | | S | S | N |

$^a$molar ratio of reactive $NH_2$ and COOH groups;
$^b$based on total amount of monomers used, insoluble materials < 1% in all cases;
$^c$weight-averaged molecular weight was measured by means of size exclusive chromatography;
$^d$S: soluble; N: insoluble.

Comparative Examples 3–5
Hyperbranching Polymerization of tris(2-aminoethyl)amine ($A_3$) and 1,4-cyclohexanedicarboxylic acid ($B_2$) in organic solvents A typical example of making hyperbranched polyamides from hyperbranching polymerization of tris(2-aminoethyl) amine ($A_3$) and 1,4-cyclohexanedicarboxylic acid ($B_2$) in organic solvent is described as follows:

Example 3: All reactants, tris(2-aminoethyl)amine (44 grams), 1,4-cyclohexanedicarboxylic acid (17 gram), pyridine (35 grams), N-methylpyrolidinone (396 grams) and triphenyl phosphate (93 grams), were charged into a 1L three-neck round bottom flask along with a stir bar. The solution was stirred at 80° C. in a nitrogen atmosphere for three hours. The product was precipitated in 2L of cold ether, collected via suction filtration and dried in the vacuum oven.

Examples 4 and 5: The general process of Example 3 was repeated, except for changing the molar ratio of reactants to obtain a different ratio of reactive $NH_2$ and COOH groups.

Table 2 shows the polymerization results.

TABLE 2

| No | [A]/[B] | $[M]_o{}^a$ | $[P(OPh)_3]/[NH_2]$ | T, hr | Yield | Tg, ° C. |
|---|---|---|---|---|---|---|
| 3 | 9/2 | 3.25% | 1/3 | 3 | 30% | 83 |
| 4 | 3/1 | 3.25% | 1/3 | 3 | c | |
| 5 | 3/2 | 3.25% | 1/3 | 3 | c | |

$^a$initial monomer concentration in solvent, g/ml;
$^b$based on total amount of monomers used;
$^c$only trace amount of soluble materials were collected and significant amount of insoluble material were obtained.

While hyperbranching polymerization of tris(2-aminoethyl)amine ($A_3$) and 1,4-cyclohexanedicarboxylic acid ($B_2$) in organic solvents and in the presence of condensation agent worked with relatively high molar ratio of amines to acid group in monomers in Comparative Example 3, Comparative Examples 4 and 5 demonstrate that polymerization of monomers with functional group ratios closer to one did not result in successful polymerization as was attained in Examples 1 and 2.

Example 6–17
Hyperbranching Polymerization of tris(2-aminoethyl)amine ($A_3$) and succinic acid ($B_2$) in water A variety of experimental conditions as designated in Table 3 were employed for the polymerization of tris(2-aminoethyl)amine ($A_3$) and succinic acid ($B_2$) in water. The general procedure employed was otherwise generally the same as in Example 1, except for using succinic acid instead of 1,4-cyclohexanedicarboxylic acid as $B_2$ monomer. The polymerization results are summarized in Table 3.

TABLE 3

| No | [A]/[B] | $H_2O$ % | T, ° C. | Time, h | $P^a$, kPa | Yield | Tg, ° C. | $M_{w,SEC}$ |
|---|---|---|---|---|---|---|---|---|
| 6 | 3/1 | 34 | 235 | 3.5 | 2758 | 71% | 34 | |
| 7 | 3/2 | 35 | 235 | 3.5 | 2758 | 47% | 53 | |
| 8 | 3/4 | 33 | 235 | 3.5 | 2758 | 60% | 50 | |
| 9 | 3/2 | 35 | 215 | 3.5 | 690 | 92% | 61 | |
| 10 | 3/2 | 5 | 210 | 3.5 | 620 | 83% | 48 | 12,000 |
| 11$^b$ | 3/2 | <0.5 | 200 | 3.5 | <140 | Gel | | |
| 12 | 3/2 | 30 | 250 | 3.5 | 2896 | 93% | 58 | 3,800 |
| 13 | 3/2 | 30 | 280 | 3.5 | 3999 | 93% | 67 | 4,800 |
| 14 | 1/1 | 30 | 250 | 3.5 | 2689 | 90% | 68 | 11,800 |
| 15 | 1/1 | 30 | 280 | 3.5 | 4482 | 63% | 52 | 2,000 |
| 16 | 1/1 | 30 | 210 | 3.5 | 690 | 80% | 82 | 6,900 |
| 17 | 1/1 | 30 | 250 | 15 | 2758 | 65% | | |

$^a$polymerization pressure;
$^b$comparison

The above results show that soluble (non-gelled) highly branched polyamides of relatively high molecular weight (e,g, above 1,000, above 2,000, above 4,000, and more preferably above 6,000) may be obtained from processes in accordance with the invention employing multifunctional monomers with a variety of amine to carboxylic acid functional group molar ratios.

Example 18
Hyperbranching Polymerization of L-Lysine ($AB_2$ monomer)

An admixture of 13.5 grams of L-lysine and 8 grams of deionized water was added to a 50 ml stainless steel autoclave. Polymerization was carried out at 250° C. and under 2689 kPa (390 psi) for 3 hours. The resulting polymer was precipitated twice from cold acetone and dried at room temperature under vacuum for 24 hours with 90% yield.

Example 19
Hyperbranching Polymerization of tris(2-aminoethyl)amine ($A_3$) and succinic anhydride ($B_2$) in water 8.88 grams of tris(2-aminoethyl)amine ($A_3$) was charged into a round bottom flask containing 35 ml of ethanol and a stir bar. After cooling down the solution with a dry ice/acetone bath, a succinic anhydride THF solution (6.07 grams of monomer in 20 ml of THF) was slowly added over a 30 min period of time. The solution was then allowed to stir at room temperature for two hours and the solvents were removed by rotory evaporation. Polymerization of a monomer solution comprising the dry powder as prepared above and 7.7 ml of deionized water at 250° C. and under 2827kPa (410 psi) for 3.5 hours gave rise to hyperbranched polyamides with 85% yield. The polymer is soluble in water and methanol, but not in acetone.

Example 20
Hyperbranching Polymerization of diaminohexane ($A_2$) and 1,2,3,4-cyclopentane-tetra-carboxylic dianhydride ($B_4$) in water 10.5 grams of diaminohexane ($A_2$) was charged into a round bottom flask containing 35 ml of ethanol and a stir bar. After cooling down the solution with a dry ice/acetone bath, a 1,2,3,4-cyclopentane-tetra-carboxylic dianhydride THF solution (6.33 grams monomer in 15 ml of THF) was slowly added over ca. 30 min period of time. The solution was then allowed to stir at room temperature for two hours and the solvents were removed by rotory evaporation. Polymerization of a monomer solution comprising the dry powder as prepared above and 7.4 ml of deionized water at 250° C. and under 3172 kPa (460psi) for 3.5 hours gave rise to white powder hyperbranched polyamides with 82% yield. The polymer is soluble in acidic water, and has a Tg of 65° C.

Example 21
Hyperbranching Polymerization of 1,4-diaminobutane ($A_2$) and trimesic acid ($B_3$) in water A 40% salt solution in water was first prepared by heating a mixture of diaminobutane ($A_2$, 4.4grams) and trimesic acid ($B_3$, 10.5 grams) in 10 ml of water at 60° C. for 2 hours. Polymerization of the monomer salt solution prepared above was carried out at 250° C. and under 3172 kPa (460psi) for 3.5. The polymer was precipitated from cold acetone with 90% yield.

Example 22
Preparation of hyperbranched polyamide with fully dendritic units

A mixture of 2.30 grams of polymer obtained from Example 14 and 7.40 grams of 2-dodecen-1-yl succinic anhydride in 30 ml of methylsulfoxide was stirred at room temperature for 4 hours. The final polymer was precipitated from acetone and dried under vacuum overnight. Both NMR and MS spectra confirmed a complete transformation of —$NH_2$ groups to —NH—C(O)— units. The solubility of the polymers before and after modification was also different: the parent polymer was soluble in both acidic and basic water, while the modified polymer was only dispersible in basic water.

The invention has been described in detail with particular reference to certain preferred embodiments thereof, but it will be understood that variations and modifications can be effected within the spirit and scope of the invention.

What is claimed is:

1. A polymerization process for producing soluble hyperbranched polyamides comprising
(a) combining in a reactor water and ($a_1$) multi-functional di- or higher amine functional group containing monomers represented by the following formula (I) and multi-functional di- or higher carboxylic acid functional group containing monomers represented by the following formula (II), or a preformed salt of such di- or higher functional monomers, or ($a_2$) multi-functional branching monomers of the formula (III):

$$R^1(NH_2)_x \quad \text{(I)}$$

$$R^2(COOH)_y \quad \text{(II)}$$

$$A_n\text{—L—}B_m \quad \text{(III)}$$

where in formulas (I) and (II), $R^1$ and $R^2$ are each independently a monomeric, oligomeric, or polymeric compound nucleus, x and y are integers of at least 2, without x and y being 2 at the same time, and in formula (III), one of A and B represents an amine functional group, the other of A and B represents a carboxylic acid functional group, L represents a monomeric, oligomeric, or polymeric compound nucleus linking group between A and B, n is at least 1 and m at least 2, and wherein multiple carboxylic acid functional groups of a multi-functional monomer may be in anhydride form, and
(b) reacting amine and carboxylic acid functional groups of the multi-functional monomers at a temperature of at least 100° C. and a pressure of at least 140 kPa, wherein polymerization proceeds by reaction of an amine group of a first monomer unit with an acid group of a second monomer unit to form a reaction product having an amide linkage between the first and second monomer units and repetition of such amidation reaction between additional amine groups and acid groups of the multi-functional monomers and reaction products of the multi-functional monomers for a period of time sufficient to form a highly branched polyamide.

2. A process according to claim 1, wherein multi-functional branching monomers of formula (III) are employed.

3. A process according to claim 2, wherein n is 1 and m is 2 or 3.

4. A process according to claim 3, wherein m is 2.

5. A process according to claim 2, wherein A represents an amino group and B represents a carboxylic acid group.

6. A process according to claim 2 wherein B represents an amino group and A represents a carboxylic acid group.

7. A process according to claim 1, wherein multi-functional di- or higher amine functional group containing monomers of formula (I) and multi-functional di- or higher carboxylic acid functional group containing monomers of formula (II), wherein x and y are integers from 2 and 4, without x and y being 2 at the same time, or a preformed salt of such monomers, are employed.

8. A process according to claim 7, wherein one of x and y is 2 and the other of x and y is 3.

9. A process according to claim 8, wherein x is 2 and y is 3.

10. A process according to claim 8, wherein y is 2 and x is 3.

11. A process according to claim 7, wherein the multi-functional acid monomer comprises an anhydride group containing monomer.

12. A process according to claim 7, wherein the ratio of total amine to acid groups of the multifunctional monomers is from 0.2 to 6.

13. A process according to claim 7, wherein the ratio of total amine to acid groups of the multifunctional monomers is from 0.3 to 3.

14. A process according to claim 13, wherein the multifunctional monomers employed in the process include at least one multifunctional amine or multifunctional acid group containing aliphatic monomer.

15. A process according to claim 7, wherein the multifunctional monomers employed in the process include at least one multifunctional amine or multifunctional acid group containing aliphatic monomer.

16. A process according to claim 1, wherein the temperature employed during polymerization is from 100 to 350° C., and the pressure varies from 140 kPa to $50 \times 10^3$ kPa.

17. A process according to claim 16, wherein the temperature employed during polymerization is from 150 to 280° C.

18. A process according to claim 16, wherein the pressure varies from 600 kPa to $7 \times 10^3$ kPa.

19. A process according to claim 1, wherein the temperature is from 100 to 350° C. and the pressure from 140 kPa to $50 \times 10^3$ kPa during a first stage of polymerization, and further comprising heating solid polymer synthesized in such first stage to higher temperature to facilitate further reaction and obtain higher molecular weight polymer.

20. A process according to claim 1, wherein the content of water in the reactor at the start of polymerization is from 0.1 to 99.9 wt % in relation to total amount of solution.

21. A process according to claim 20, wherein the content of water in the reactor at the start of polymerization is from 0.5 to 50 wt %.

22. A process according to claim 20, wherein the content of water in the reactor at the start of polymerization is from 1 to 30 wt %.

23. A process according to claim 1, wherein the multifunctional monomers employed in the process include at least one multifunctional amine or multifunctional acid group containing aliphatic monomer.

24. A soluble highly branched polyamide obtained from condensation of multifunctional amine and multifunctional acid functional group containing monomer reactants, wherein at least one of the multifunctional amine and the multifunctional acid monomers is aliphatic and the ratio of total amine functional groups to carboxylic acid functional groups in the monomer reactants is from 0.3 to 3.

25. A soluble highly branched polyamide obtained from condensation of multifunctional amine and multifunctional acid functional group containing monomer reactants, wherein at least one of the multifunctional amine and the multifunctional acid monomers is aliphatic and the weight averaged molecular weight is above 1,000.

26. A soluble highly branched polyamide according to claim 25, wherein the weight averaged molecular weight is above 2,000.

27. A soluble highly branched polyamide according to claim 25, wherein the weight averaged molecular weight is above 4,000.

28. A soluble highly branched polyamide according to claim 25, wherein the weight averaged molecular weight is above 6,000.

* * * * *